(12) United States Patent
Hünner

(10) Patent No.: US 7,199,990 B2
(45) Date of Patent: Apr. 3, 2007

(54) DEVICE FOR SHORT-CIRCUITING TWO ELECTRIC LINES FOR REDUCING A VOLTAGE DIFFERENTIAL

(75) Inventor: Martin Hünner, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/503,071

(22) PCT Filed: Jan. 17, 2003

(86) PCT No.: PCT/DE03/00131

§ 371 (c)(1),
(2), (4) Date: May 2, 2005

(87) PCT Pub. No.: WO03/065534

PCT Pub. Date: Aug. 7, 2003

(65) Prior Publication Data

US 2005/0219783 A1    Oct. 6, 2005

(30) Foreign Application Priority Data

Jan. 30, 2002    (DE) .............................. 102 03 602

(51) Int. Cl.
*H02H 3/20*     (2006.01)
*H02H 9/04*     (2006.01)

(52) U.S. Cl. .................. 361/91.5; 361/91.6; 361/91.1
(58) Field of Classification Search ............... 361/91.5, 361/91.1, 91.6; 307/113
See application file for complete search history.

(56) References Cited

U.S. PATENT DOCUMENTS 5,436,786 A    7/1995    Pelly et al.
5,856,904 A *  1/1999    Pelly et al. .................. 361/111

FOREIGN PATENT DOCUMENTS

DE    36 40 661 A1    6/1988
WO    WO 01/00610 A1  1/2001

* cited by examiner

*Primary Examiner*—Stephen W. Jackson
*Assistant Examiner*—Dharti H. Patel
(74) *Attorney, Agent, or Firm*—Harness, Dickey & Pierce, P.L.C.

(57) ABSTRACT

A device is for short-circuiting a first electric line with a second electric line in order to reduce a voltage differential. At least one first electronic switching device is provided between the first and second lines and at least one second electronic switching device is arranged anti-parallel to the first switching device. No mechanical switch is present for the direct short-circuiting operation.

14 Claims, 2 Drawing Sheets

DEVICE FOR SHORT-CIRCUITING TWO ELECTRIC LINES FOR REDUCING A VOLTAGE DIFFERENTIAL

This application is the national phase under 35 U.S.C. § 371 of PCT International Application No. PCT/DE03/00131 which has an International filing date of Jan. 7, 2003, which designated the United States of America and which claims priority on German Patent Application number DE 102 03 602.0 filed Jan. 30, 2002, the entire contents of which is hereby incorporated herein by reference.

FIELD OF THE INVENTION

The invention generally relates to a device for short-circuiting a first electrical line with a second electrical line for the purpose of reducing a potential difference or voltage differential. Preferably, at least one first electronic switching apparatus and, back-to-back in parallel with this, at least one second electronic switching apparatus are arranged between the first and the second line, it being possible for a potential difference occurring between the first and the second electrical line to be bridged by at least one of the two electronic switching apparatuses. The first electronic switching apparatus preferably operates when the potential of the second electrical line is greater, by a predeterminable differential value, than the potential of the first electrical line. Further, the second electronic switching apparatus preferably operates when the potential of the first electrical line is greater, by a predeterminable differential value, than the potential of the second electrical line.

BACKGROUND OF THE INVENTION

A known device is disclosed in WO 01/06610 A1. An essential component in the known device is a mechanical switch which is connected to a voltage-detecting device. The two are each arranged between the two electrical lines. When the potential difference, which is detected by the voltage-detecting device, between the first and the second electrical line is too great, the switch is closed, and a short circuit is brought about between the two lines. Only as an addition to the mechanical switch are electronic switching units provided which are, however, only intended to supplement the mechanical switch. The mechanical switch containing movable parts essentially brings about the reduction in an undesired potential difference between the first and the second line.

Such devices for short-circuiting two electrical lines are often used in railroad power supply systems. In the case of a DC supply, the first electrical line is the rail, which acts as the return line, and the second electrical line is the structure ground (ground line).

In the case of isolator flashovers, potential differences between the rail and the structure ground may occur which may destroy modules which are connected to the rails.

SUMMARY OF THE INVENTION

An embodiment of the invention includes an object of specifying a device for short-circuiting two electrical lines for the purpose of reducing a potential difference or voltage differential, which is effective largely without any movable parts.

An object may be achieved according to an embodiment of the invention by no mechanical switches being provided for direct short-circuiting purposes.

This is based on the knowledge that the short-circuiting can be reliably managed by consistent development of the power semiconductor using the two electronic switching apparatuses alone. The aim is to achieve the advantage of completely avoiding a mechanical switch which trips relatively slowly. Nevertheless, this can be done without the need for very complex electronic components.

For example, each electronic switching apparatus has a component which changes from the high-resistance state to the low-resistance state when a fixed voltage is overshot. This component makes it possible to establish the tolerable differential value of the potentials. This component may be a breakover diode, a zener diode or a comparable component.

According to another example, each electronic switching apparatus may have an electrical switch which can be operated by a voltage-monitoring device arranged between the first and the second line, and which closes immediately or with a time delay when a threshold value is overshot.

This electrical switch can be arranged, for example, in parallel with the component of the respective electronic switching apparatus. This may be, for example, a breakover diode. This provides a staggered effect.

If the direction of flow changes, the electronic switching apparatus is opened again automatically.

In order to allow the electronic switching apparatuses to have a high resistance value again independently of this, a current-detecting device can be arranged, for example, between the electronic switching apparatuses, on the one hand, and one of the two lines, on the other hand. The current-detecting device may be connected by a control line to a switch in a connecting line between the two lines. The switch serves the purpose of resetting or cancelling semiconductor switching elements of the electronic switching apparatus when the switch is closed.

If a non-critical, small current level has now been detected and the electronic switching apparatus is intended to have a high resistance value again, the switch in the connecting line is closed for a short period of time. This switch does not serve the purpose of short-circuiting the two electrical lines. It only serves the purpose of resetting (cancelling) the semiconductor switching elements, in order for them always to be capable of functioning reliably.

The electronic switching apparatuses may, for example, also operate with a time delay in order to suppress only potential differences which are too great and last for a longer period of time. For this purpose, the electronic switching apparatuses may contain thyristors which have, for example, response times of 1 to 2 microseconds.

In one embodiment, the thyristor circuitry includes at least one thyristor, whose cathode is connected to the first electrical line and whose anode is connected to the second electrical line. A drive circuit is connected to the gate of the thyristor and has a series circuit including, for example, a breakover diode, a series starting resistor and a protective diode.

In another embodiment, the thyristor circuitry includes at least one thyristor, whose cathode is connected to the second electrical line and whose anode is connected to the first electrical line. In this case, too, a drive circuit is connected to the gate of the thyristor and has a series circuit comprising, for example, a breakover diode, a series starting resistor and a protective diode.

The breakover diode has, for example, a starting voltage of 200 to 800 volts.

The device according to an embodiment of the invention has the particular advantage that two electrical lines can be reliably short-circuited, using simple devices/methods/etc. and without any complex mechanical switches, for the purpose of reducing a potential difference.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
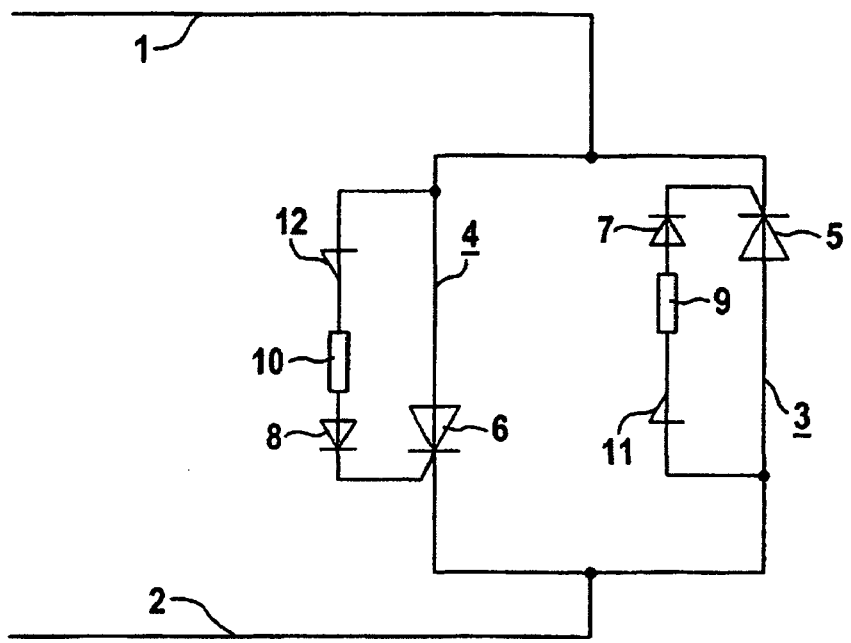
FIG. 1 shows a device for short-circuiting using breakover diodes.

All of the figures show a first line 1, which may be a rail, and a second line 2, which may be a ground line. Large potential differences may result between the two lines 1 and 2 and need to be compensated for by short-circuiting.

Used for this purpose are two electronic switching apparatuses 3 and 4, the first 3 operating when the potential of the second line 2 is greater than the potential of the first line 1, and the second electronic switching apparatus 4 operating when the potential of the first line 1 is greater than the potential of the second line 2. Each of the two electronic switching apparatuses 3 and 4 include a thyristor 5, 6 and a series circuit, arranged in parallel with said thyristor 5, 6, including firstly a protective diode 7, 8, which allows current to pass in the same direction as the thyristor 5, 6, and secondly a current-limiting resistor 9, 10.

According to FIG. 1, each of the series circuits also has a breakover diode 11, 12. The breakover diodes 11, 12 are designed such that they open when a specific potential is reached at their input. This therefore makes it possible for the associated thyristor 5, 6 to be switched in a manner that it allows current to pass. The existing semiconductor switching elements are reset or cancelled when the potential difference between the two lines 1 and 2 is zero. This simplest variant of a device for short-circuiting two electrical lines 1 and 2 for the purpose of reducing a potential difference does not use complex electronics or, in particular, complex mechanical switches.

Figure 2:
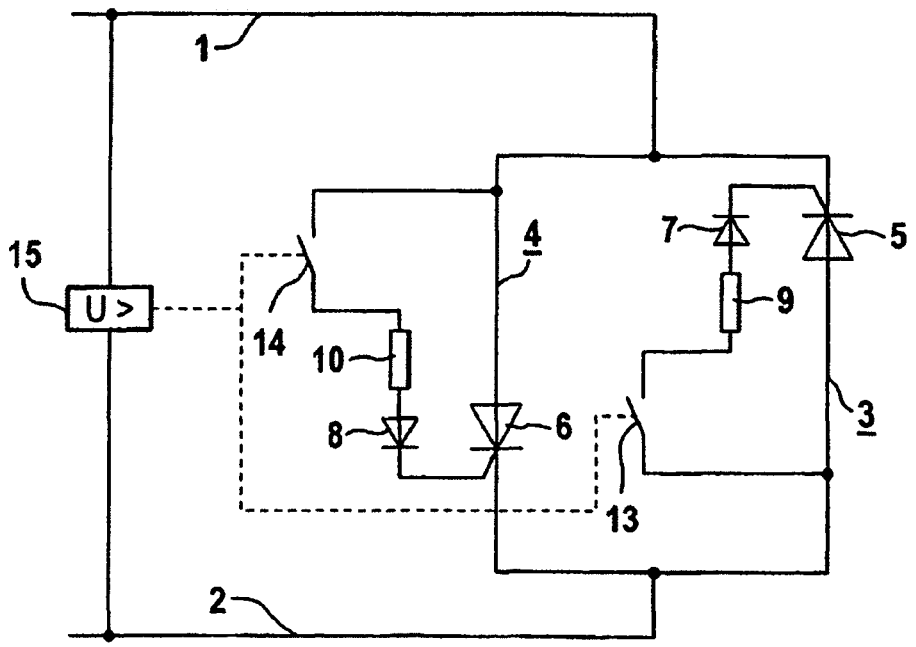
FIG. 2 shows a device for short-circuiting using a voltage-monitoring device and electrical switches.

FIG. 2 shows a variant in which the breakover diodes are replaced by electrical switches 13, 14. All other components correspond to those of the electronic switching apparatuses 3 and 4 which are shown in FIG. 1. These electrical switches 13, 14 close when a specific threshold value for the potential difference or voltage differential between the two lines 1 and 2 is reached. In order to be able to detect this potential difference, a voltage-monitoring device 15 is arranged between the first line 1 and the second line 2 and is connected by control lines to the electrical switches 13 and 14.

An advantage of the embodiment of FIG. 2 as compared with the exemplary embodiment shown in FIG. 1 is that the threshold value for the potential difference, at which an electrical switching apparatus 3 or 4 is triggered, can be varied. The threshold value can be selected by suitably setting the voltage-monitoring device 15. Different threshold values can therefore be selected for short-circuiting purposes, depending on requirements.

Figure 3:
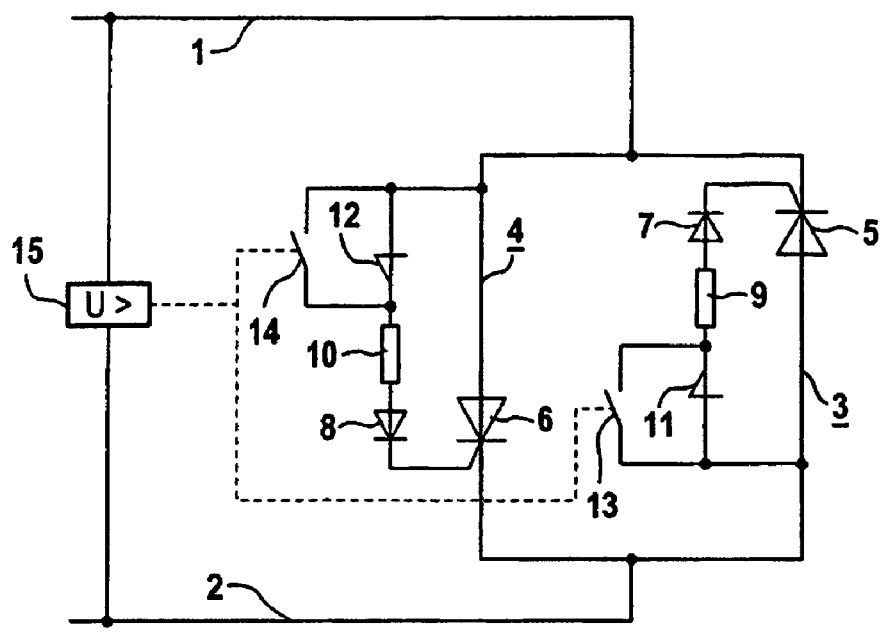
FIG. 3 shows a combination of the embodiments shown in FIGS. 1 and 2.

The embodiment shown in FIG. 3 shows a combination of the two embodiments previously described. In this case, the electrical switches 13, 14 known from FIG. 2 are arranged in parallel with the breakover diodes 11, 12 known from FIG. 1. The remaining components correspond to the described embodiments.

The combination of the breakover diode 11, 12 and the electrical switch 13, 14 in conjunction with a voltage-monitoring device 15 has an advantage that the electronic switching apparatuses 3, 4 always respond at the potential differences determined by the breakover diodes 11, 12. In addition, this is true at an even lower potential difference, as long as this potential difference, via the voltage-monitoring device 15, causes the electrical switches 13, 14 to close.

Figure 4:
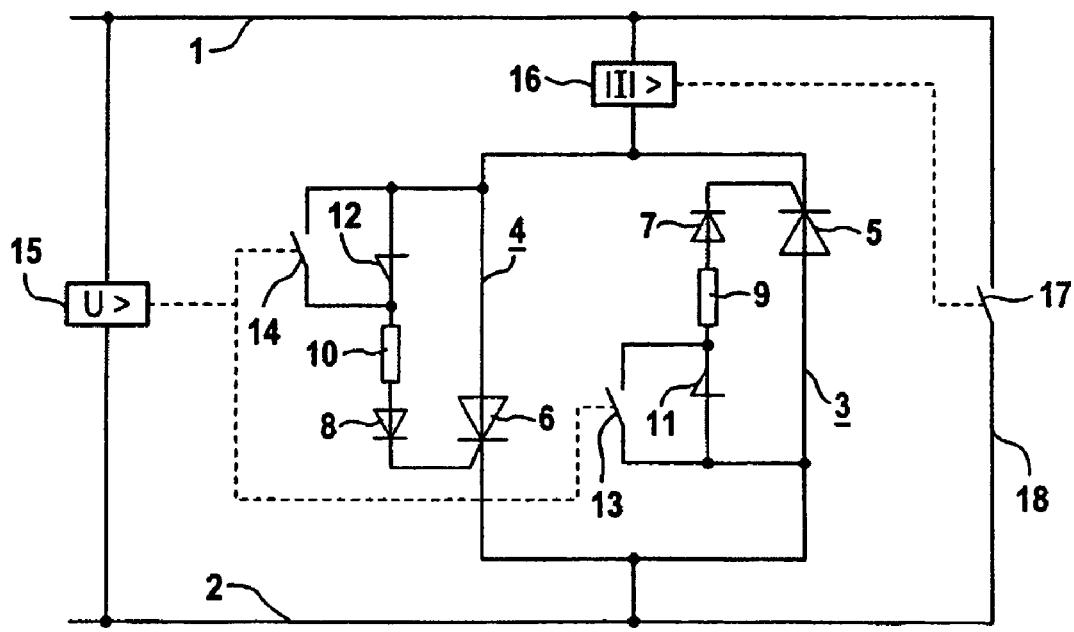
FIG. 4 shows the embodiment shown in FIG. 3 which is also equipped with a switch for resetting or cancelling semiconductor switching elements.

The embodiment shown in FIG. 4 largely corresponds to that shown in FIG. 3. In addition, a current-detecting device 16 is arranged between the two electronic switching apparatuses 3, 4, on the one hand, and the first line 1, on the other hand.

This current-detecting device 16 is arranged via a control line having a switch 17 in a connecting line 18 between the two lines 1 and 2. This has the advantage that the semiconductor switching elements of the electronic switching apparatuses 3, 4 are reset or cancelled not only when the potential difference between the lines 1 and 2 is zero.

This cancelling may also be triggered even when a small current still flows through the electronic switching apparatuses 3, 4. In this case, the current-detecting device 16 detects whether the current has fallen below a threshold value and then closes, by means of a control line, the switch 17 acting as the cancel relay.

All of the embodiments according to the invention function without any complex mechanical switches for short-circuiting purposes, which would have to be arranged directly between the two lines 1 and 2. In addition, no complex electronics are advantageously required.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A device for short-circuiting a first electrical line with a second electrical line for reducing a potential difference, comprising:
    a voltage-monitoring device connected directly between the first electrical line and the second electrical line, the voltage-monitoring device configured to adjust a threshold value and monitor a potential difference between the first electrical line and the second electrical line;
    at least one first electronic switching apparatus arranged between the first electrical line and the second electrical line;
    at least one second electronic switching apparatus, arranged between the first electrical line and the second electrical line and antiparallel to the at least one first electronic switching apparatus,
    wherein a potential difference occurring between the first and the second electrical lines is adapted to be bridged by at least one of the at least one first and second electronic switching apparatuses, the at least one first electronic switching apparatus operating if the potential of the second electrical line is greater, by a predeterminable differential value, than the potential of the first electrical line, and the at least one second electronic switching apparatus operating if the potential of the first electrical line is greater, by a predeterminable differential value, than the potential of the second electrical line;

wherein no mechanical switches are provided for short-circuiting the first electrical line to the second electrical line;

wherein each of the at least one first and second electronic switching apparatus includes a thyristor and an electrical switch, the electrical switch operable by the voltage-monitoring device;

wherein the electrical switch closes if the threshold value is exceeded, the threshold value is variable; and wherein each electrical switch is arranged in parallel with a component of a respective electronic switching apparatus, the component being one of a breakover diode and a zener diode.

2. The device as claimed in claim 1, wherein the component changes from a high-resistance state to a low-resistance state when a fixed voltage is exceeded.

3. The device as claimed in claim 1, further comprising:
a current-detecting device with a first end connected between at least one of the first and at least one of the second electronic switching apparatuses and a second end connected to one of the first electrical line and the second electrical line, wherein one of the first electrical line and the second electrical line is connected by a control line to a control line switch in a connecting line between the first electrical line and the second electrical line for the purpose of at least one of resetting and cancelling semiconductor switching elements of at least one of the first and second electronic switching apparatuses when the control line switch is closed.

4. A device for short-circuiting a first electrical line with a second electrical line, comprising:
a voltage-monitoring device connected directly between the first electrical line and the second electrical line configured to monitor the potential difference between the first electrical line and the second electrical line;
at least one first electronic switching apparatus arranged between the first and the second electrical lines; and
at least one second electronic switching apparatus arranged between the first and the second electrical lines, wherein mechanical switches are not provided for direct short-circuiting the first electrical line to the second electrical line, and wherein each of the first and second electronic switching apparatus includes a thyristor and an electrical switch operable by the voltage monitoring device, and wherein the electrical switch closes if a threshold value is exceeded;
wherein each electrical switch is arranged in parallel with a component of a respective electronic switching apparatus, the component being one of a breakover diode and a zener diode.

5. The device as claimed in claim 4, wherein a potential difference occurring between the first and the second electrical line is adapted to be bridged by at least one of the at least one first and second electronic switching apparatuses.

6. The device as claimed in claim 4, wherein the at least one first electronic switching apparatus operates when the potential of the second electrical line is greater, by a differential value, than the potential of the first electrical line, and the at least one second electronic switching apparatus operates when the potential of the first electrical line is greater, by a differential value, than the potential of the second electrical line.

7. The device as claimed in claim 4, wherein the at least one first electronic switching apparatus operates when the potential of the second electrical line is greater, by a differential value, than the potential of the first electrical line, and the at least one second electronic switching apparatus operates when the potential of the first electrical line is greater, by a differential value, than the potential of the second electrical line.

8. The device as claimed in claim 4, wherein the component changes from a high-resistance state to a low-resistance state when a fixed voltage is exceeded.

9. The device as claimed in claim 4, further comprising:
a current-detecting device with a first end connected between at least one of the first and at least one of the second electronic switching apparatuses and one of the first electrical line and the second electrical line, wherein one of the first electrical line and the second electrical line is connected by a control line to a control line switch in a connecting line between the first electrical line and the second electrical line for the purpose of at least one of resetting and cancelling semiconductor switching elements of at least one of the first and second electronic switching apparatuses when the control line switch is closed.

10. A device for short-circuiting a first electrical line with a second electrical line, comprising:
at least one first electronic switching means arranged between the first and the second electrical lines; and
at least one second electronic switching means arranged between the first and the second electrical lines, at least one of the first and second electronic switching means for bridging a potential difference occurring between the first and the second electrical line,
wherein mechanical switches are not provided for direct short-circuiting the first electrical line to the second electrical line;
wherein the first and second electronic switching means are one of reset and cancelled when the potential difference between the first electrical line and second electrical line is zero;
a thyristor and electrical switching means for each of the first and second electronic switching means; and
at least one voltage-monitoring means, arranged between the first and the second line, for operating the electrical switching means;
wherein each electrical switching means is arranged in parallel with a component of a respective electronic switching means, the component being one of a breakover diode and a zener diode.

11. The device as claimed in claim 10, wherein the at least one first electronic switching means is for operating when the potential of the second electrical line is greater, by a differential value, than the potential of the first electrical line, and the at least one second electronic switching means is for operating when the potential of the first electrical line is greater, by a differential value, than the potential of the second electrical line.

12. The device as claimed in claim 10, wherein the component changes from a high-resistance state to a low-resistance state when a fixed voltage is exceeded.

13. The device as claimed in claim 10, further comprising:
means for detecting current with a first end connected between at least one of the first and at least one of the second electronic switching apparatuses and a second end connected to one of the first electrical line and second electrical line, wherein one of the first electrical line and the second electrical line is connected by a control line to a control line switch means, in a connecting line between the first electrical line and the second electrical line, for at least one of resetting and cancelling semiconductor switching elements of at least one of the first and second electronic switching means when the control line switch means is closed.

14. The device as claimed in claim 1, wherein the electrical switch closes if the threshold value is exceeded after a time delay.

* * * * *